Patented Aug. 25, 1936

2,052,470

UNITED STATES PATENT OFFICE 2,052,470

MANUFACTURE OF COATING COMPOSITIONS

Robert Tyler Hucks, South River, N. J., assignor to E. I. du Pont de Nemours & Company, Wilmington, Del., a corporation of Delaware No Drawing. Application February 23, 1935, Serial No. 7,844

3 Claims. (Cl. 134—79)

This invention relates to an improved process for manufacturing cellulose derivative coating compositions and more particularly to a process for dispersing pigments in cellulose derivative vehicles.

Heretofore, in the manufacture of pigmented cellulose derivative enamels, the pigment was generally dispersed in the vehicle by intensive mechanical disintegration. The pigments utilized as coloring matter for these enamels are in the form of finely divided opaque powders, many of which are produced by chemical precipitation. Some are obtained by combustion or calcining processes and still others are naturally occurring minerals which are ground and bolted to a suitable fineness. In any event, however, it is customary practice to grind the pigments in a part of the ultimate composition in order to break up pigment agglomerates which are formed during the latter stages of the manufacture of chemically precipitated pigments, or to supplant the occluded air which is usually present on the surface of other types of pigments with the vehicle or certain ingredients of the vehicle.

To accomplish these ends and to disperse the pigment, various grinding processes are resorted to. For example, the pigment may be ground in the presence of part of the ultimate composition in a buhrstone mill. For this equipment the pigment-liquid medium combination must be maintained in a very fluid state, that is, a low working consistency in order that the stone or metal discs may function properly. In this method the dispersion is effected by a rubbing action whereby the pigment agglomerates are broken up by mechanical attrition.

Another method of dispersing pigments in cellulose derivative vehicles involves the use of a ball mill. In this case the pigment is ground in the presence of a vehicle usually comprising a resin solution, or a plasticizer and a resin solution, or a combination of resin solution, plasticizer and pyroxylin. Grinding is accomplished by means of pebbles or steel balls which are added to the mill in suitable proportions. In this process the consistency of the pigment-liquid medium is also relatively low, in order to permit the balls to cascade through the medium to provide the impact and rubbing action necessary to reduce the pigment agglomerates. This process is also one of mechanical disintegration and attrition.

A third procedure sometimes utilized makes use of a three roller ink mill. In this mill there are three metal cylinders aligned horizontally. The first and third cylinders are made to revolve in the same direction and the center cylinder is made to revolve in the opposite direction. The speeds of rotation of the respective cylinders are so arranged that the peripheral speed of the second cylinder is greater than that of the first and the peripheral speed of the third cylinder greater than that of the second. The pigment and liquid medium in which it is to be dispersed (usually a portion of the ultimate composition) is brought into contact between the first and second cylinders, where due to the differential speed of the rollers, dispersion takes place because of the rubbing action of the metal surfaces against the thin layer of pigment-vehicle mixture. For this process the mixture must be fairly liquid and the operation is again one of mechanical disintegration.

In some instances a rubber mill has also been used with some success, particularly for the softer type pigments. This equipment consists essentially of two heavy metal rolls which usually turn at differential speeds. They may be adjusted so that they are in very close contact, thereby exerting considerable pressure on the material which is run through the mill. For this process, the cellulose derivative medium in which the pigment is dispersed consists of a solid colloid (the cellulose derivative having been previously colloided with a plasticizer and a small amount of solvent). This colloid is sheeted through the mill under pressure of the heavy rolls and the pigment added with continued rolling of the mixture. In most cases, several passes through the mill are required to disperse the pigment satisfactorily.

All of these processes commonly used heretofore are largely dependent upon mechanical disintegration or attrition to break up pigment agglomerates or to remove occluded air from the pigment particles. These methods are characterized by certain deficiencies which are not conducive to manufacturing economy.

An object of the invention is the provision of a process for dispersing pigments which affords substantial manufacturing economies in that the cycle of operation is short and labor costs are greatly decreased.

A further object is the provision of a process for dispersing pigments that obviates contamination of the final composition by foreign substances through abrasion of surfaces of machinery or metal balls in close contact.

A still further object is the provision of a process for dispersing pigments in cellulose derivative vehicles which permits the use of consistencies of vehicle not operable in the processes practiced heretofore.

A still further object is the provision of an intermediate product in the manufacture of cellulose derivative compositions which by the addition of remaining ingredients followed by simple mixing affords a final composition that is equal or superior in its characteristics to compositions of this type heretofore available.

Other objects will become apparent as the description of the invention proceeds.

These objects are accomplished by kneading the pigment and cellulose derivative medium in the optimum proportions to disperse the pigment quickly and effectively in the medium.

In carrying out the process of the invention, a cellulose derivative, such as nitrocellulose, cellulose acetate or cellulose ether, is first colloided in suitable solvents by mixing methods well known in the art to form a so-called "base" solution. This intermediate is then kneaded with the pigment in a kneading machine such as a Werner & Pfleiderer mixer, which is similar to the dough mixing machines used in the bread industry, for a time cycle of sufficient duration to provide suitable dispersion of the pigment in the primary intermediate.

It has been found that if the composition of the cellulose derivative base solution and the ratio of pigment to this solution is carefully adjusted, the pigment may be dispersed therein very effectively and in a relatively short time as compared with the methods now in general use. It will be apparent that there are at least three factors which may be varied in this process, namely, the viscosity characteristic of the cellulose derivative, the amount of pigment added to a given amount of a solution thereof, and the amount of solvent added.

It is impractical to give the operative range of these three variables, but it has been found that if they are adjusted so that they offer the maximum resistance to the blades of the mixer in which they are kneaded, the pigment will be dispersed in the most effective manner. It is believed that the energy required to turn the blades of the kneading machine is largely used to reduce the size of the agglomerates and disperse the pigment in the medium. This is evidenced by the fact that the temperature of the ingredients in the mixer rises very rapidly a few minutes after the pigment is added to the mass as it is kneaded. This rise in temperature may be considered indicative of the efficiency of the operation.

If the ratio of pigment added is too low, the mixer will revolve with comparative ease and the degree of dispersion will be of a relatively low order. As the percentage is increased the energy required to revolve the blades of the mixer increases. As the ratio of pigment to base solution is further increased so that the mass has a crumbly consistency, the blades of the mixer will pass through the mass and dispersion will be materially decreased. The resistance which the material offers to the blades of the mixer will likewise be lessened.

The following examples are given to illustrate how the viscosity of the cellulose derivative and the percentage of solvents, and the ratio of pigment to base solution, may be varied:

*Example 1*

A nitrocellulose base solution is first prepared by mixing nitrocellulose with solvents in the proportions indicated as follows:

| | Pounds |
|---|---|
| Nitrocellulose (½ sec. viscosity) | 20 |
| Ethyl acetate | 40 |
| Butyl acetate | 15 |
| Ethyl alcohol (denatured) | 10 |
| Toluene | 15 |
| | 100 |

One hundred pounds of this solution is placed in a suitable masticating or kneading machine and 300 pounds of zinc oxide are added gradually while the machine is working the base solution. A thick putty-like mass or paste of high consistency is formed and this mixture is kneaded for from 5 minutes to 3 hours, depending upon the degree of dispersion and gloss desired in the final enamel. At the end of the kneading cycle an additional quantity of the nitrocellulose base solution (approximately 100 pounds) is added to facilitate removal of the charge from the machine. This intermediate product may then be conveniently utilized in the manufacture of commercial enamels by the addition of other ingredients such as resins, plasticizers, solvents, etc., followed by a simple mixing operation.

*Example 2*

| | Pounds |
|---|---|
| Nitrocellulose (viscosity 16 sec.) | 8 |
| Ethyl acetate | 46 |
| Butyl acetate | 17 |
| Ethyl alcohol | 12 |
| Toluene | 17 |
| | 100 |

The above composition is prepared as in Example 1 and placed in a kneading machine, and 600 pounds of zinc oxide is then added and kneaded.

*Example 3*

| | Pounds |
|---|---|
| Nitrocellulose (viscosity 25 sec.) | 5 |
| Ethyl acetate | 48 |
| Butyl acetate | 17.5 |
| Ethyl alcohol | 12 |
| Toluene | 17.5 |
| | 100 |

A base solution is made up according to the above formula in the manner indicated in Example 1. Into the 100 pounds of this base solution is kneaded 600 pounds of zinc oxide, and when sufficiently dispersed more base solution is added to facilitate the removal of the batch from the kneading machine.

*Example 4*

A nitrocellulose base solution was prepared from the following ingredients:

| | Per cent |
|---|---|
| Nitrocellulose (viscosity ½ sec.) | 30 |
| Alcohol (denatured) | 22 |
| Ethyl acetate | 33 |
| Butyl acetate | 8 |
| Toluene | 7 |
| | 100 |

Four hundred and fifty pounds of chrome orange pigment were kneaded with 50 pounds of this nitrocellulose base solution for about three hours. After this operating cycle, an additional 84 pounds of the nitrocellulose base solution were added to the kneading machine to facilitate removal of the batch.

Example 5

|   | Pounds |
|---|---|
| Nitrocellulose (viscosity ½ sec.) | 206 |
| Alcohol (denatured) | 55 |
| Toluene | 17 |
| Acetone | 7 |
| *Dammar gum solution | 47 |
| Amyl alcohol | 47 |
| Carbon black | 30 |
| Dibutyl phthalate | 6 |
|   | 415 |

*A solution prepared by mixing equal parts of dammar gum and a 50—50 mixture of ethyl alcohol and toluene, from which the resene has been removed by settling and decantation.

This example represents a modification of the process wherein the pigment is kneaded with a relatively heavier base solution than those utilized as the dispersing medium in the previous examples. In this instance the nitrocellulose, coloring matter and dammar are kneaded with the solvents and diluents as indicated for a period of about 30 minutes. The dibutyl phthalate in the proportion shown is then added and kneading continued for about 45 minutes. Upon removal from the kneading machine, the product may, if desired, be sheeted through the rubber rolls to bring the material to such physical state as to facilitate mixing with the remaining ingredients which go to make up the final enamel.

Example 6

|   | Pounds |
|---|---|
| Zinc oxide | 79 |
| Nitrocellulose (viscosity ½ sec.) | 12 |
| Alcohol (denatured) | 3 |
| Dibutyl phthalate | 6 |
|   | 100 |

This example is similar to Example 5 except that the operating consistency is even greater. The operating cycle is generally lower also and successful results may be secured with a kneading cycle of as low as five minutes. The mixture may be removed from the machine without the addition of further solvents and if preferred may be sheeted through loosely set rubber mill rolls to facilitate final preparation of the enamel as carried out in an ordinary mixing machine with the addition of the remaining ingredients of the enamel.

The viscosity characteristic in the above examples is given in seconds Hercules.

Example 7

A cellulose acetate base solution was prepared by dissolving 15 parts by weight of cellulose acetate of a combined acetic acid value of about 55% and a viscosity characteristic of five seconds, in 15 parts by weight of diacetone alcohol, 35 parts of acetone oil and 35 parts of acetone. One hundred pounds of this solution were placed in a suitable kneading machine and 500 pounds of zinc oxide added. This mixture was kneaded for from 5 minutes to 3 hours, depending upon the degree of gloss and dispersion desired. At the end of this operation an additional amount of the original cellulose acetate solution was mixed with the pigmented paste in sufficient amount to cause it to flow readily under its own weight to facilitate handling.

The viscosity characteristic as indicated in this example was determined according to the procedure outlined in A. S. T. M. specifications D—301—33, page A 294, formula B, except that acetone was substituted for the solvent shown, modified to utilize a glass cylinder with an inside diameter of 1⅜ inches±1/32 inch and a steel ball 0.2500±.0003 inch in diameter and of 1.042±.010 grams in weight.

Other solvents than those described in this example may be utilized in preparing the cellulose acetate base solutions. For example, methyl ethyl ketone, ethyl acetate, ethyl lactate, ethylene glycol monomethyl ether, glycol diacetate, benzyl alcohol, ethylene glycol monomethyl ether monoacetate, etc., have been found satisfactory.

In the case of the nitrocellulose base solutions, any of the solvents commonly employed in the manufacture of nitrocellulose lacquers may be used. Among these may be included esters such as ethyl, butyl, amyl acetates, and the acetate of ethylene glycol monoethyl ether, alcohols such as methyl, ethyl, butyl and amyl alcohols, hydrocarbons of the aromatic or aliphatic series, such as benzene, toluene, xylol, naphtha, etc.

The base solutions may be used without the addition of other ingredients, but, if desired, any suitable resin or plasticizer which may be incorporated in the final enamel may be added to the base solution in the kneading machine prior to adding the pigment. Such resins as dammar, ester gum, elemi, shellac, or synthetic resins have been satisfactorily employed. In the case of the cellulose acetate solutions, care must be taken that the resin chosen be compatible with this cellulose derivative. Common plasticizers such as tricresyl phosphate, dibutyl phthalate, camphor, triacetin, para toluene sulfonamide, dibutyl tartrate, triphenyl phosphate, etc., have also been included in the base solutions with satisfactory results.

The cellulose derivative solution in which the pigment is kneaded may be made from a nitrocellulose or cellulose acetate of any available viscosity. The viscosity characteristic of the cellulose derivative is not a critical factor in the operation of the process, since satisfactory results have been obtained over a wide range of viscosities. For example, suitable products have been prepared from nitrocelluloses of viscosity characteristics between approximately ¼ second and 25 seconds or even higher. However, in cases where the viscosity characteristic of the cellulose derivative is relatively high, best results are secured by reducing the amount of pigment to be incorporated by the kneading operation.

The time required for suitable dispersions of the pigment will vary within rather wide limits, depending upon the viscosity of the dispersing vehicle, the particular pigment used, the efficiency of the kneading apparatus, etc. In general, however, it is possible to satisfactorily disperse most pigments in a period of ½ to 3 hours. In some cases acceptable results may be obtained with even as short a kneading period as five minutes.

The process of the invention is applicable to the dispersion of practically any of the pigments commonly utilized in the manufacture of cellulose derivative enamels. The following constitutes a partial list of some of the pigments which have been effectively dispersed: zinc oxide, lithopone and other sulfide pigments, Titanox and other titanium oxide pigments, China clay, chrome yellow, chrome orange, toners (para toluidine, maroon, etc.), chrome green, lakes (maroon, black, etc.), ultra-marine blue, iron blues (Prussian, Milori, Chinese blues), iron oxide, ochre, burnt umber, carbon black, bone black, lamp black, Timonox and other antimony oxide pigments.

The degree or completeness of dispersion varies with the type of pigment employed. Pigments which are inherently hard are, of course, more difficult to disperse. The majority of the available pigments when dispersed according to the present invention provide enamel compositions which afford satisfactory finishes without further treatment. In certain cases such as the iron blues, deep chrome greens, and bone black, it may be necessary to resort to some common means of filtration or clarification to remove any agglomerates which are not broken up by the kneading action of the process.

As suggested above, the factor which exerts greatest influence on the successful operation of the invention is that of the "consistency" of the mass (vehicle and pigment) during the kneading treatment. Attempts have been made to establish numerical limits for operating consistencies but due to the inherent characteristics of the material in this state, it has not been possible to secure consistently representative figures. Roughly, however, best operating conditions lie between a consistency where the mass will just flow under its own weight and that point where the mass is so stiff that prolonged heavy pressure with the thumb will just make an impression. In general it is preferred to operate at or near the upper limit of consistency.

If the consistency as indicated by the ratio of pigment to base solution, taking also into account the viscosity of the cellulose derivative and the percentage of solvents, is plotted against energy necessary to turn the kneading machine at a given rate, the resulting curve would rise to a maximum and then fall off again. This fall indicates the consistency as it approaches the stage where the batch revolves with less shearing effect on the agglomerates, or the blades of the mixer pass through it without promoting dispersion of the pigment. As mentioned above, I prefer to operate under conditions which are represented by the portion of the curve at or near the maximum.

Because of the large amounts of energy transferred to the heavy mass, it has been found advantageous to absorb the heat produced by water cooling the kneading machine and sometimes even the blades so as to maintain a uniform temperature throughout the mass of not more than approximately 80° C.

The process of this invention is sharply distinguished from prior art practices in that dispersion is accomplished, not by mechanical disintegration and attrition, but by a shearing action resulting from the kneading of a pigment-cellulose derivative base solution wherein it is believed that the agglomerates are disrupted largely by the frictional pressure of pigment agglomerate against pigment agglomerate. With continued kneading the pigment particles, which are produced by the destruction of the pigment agglomerates, are probably coated with a thin film of the cellulose derivative vehicle, which prevents flocculation of the pigment particles to re-form the agglomerates.

In the process of this invention, the consistency of the mass is definitely much greater than could possibly be handled in ball mills, buhrstone or three-roller ink mills. The capacity of these types of mills is greatly limited because of the thin layers of vehicle and pigment processed. Moreover, a relatively large amount of hand labor is required for their operation. The ball mill as the exception in this group does not require so much labor, and it has large capacity, but the cycle of operation is extremely long and the resulting product is contaminated by particles from the pebbles or steel balls which have been abraded or chipped from them during the grinding cycle.

Furthermore, when pigments are dispersed in ball mills, buhrstone or three-roller ink mills, the consistency of the mixture must be carefully controlled since if it is too thin poor grinding and excessive wear on the mills result. If the mixture is too viscous, the ball mill will not function properly since the balls will not then cascade through the medium as required if the desired dispersion is to be accomplished. Too viscous mixtures are also entirely unsuited for the three-roller ink and buhrstone mills.

With the improved process of the present invention it is also possible to disperse a given amount of pigment in a less amount of cellulose derivative than is required for the rubber mill rolls described above. Thus higher yields and lower operating costs are secured. The cellulose derivative colloid which is commonly used with the rubber mill rolls is definitely solid and relatively hard and only by the application of considerable pressure and some heat is it worked between the rolls to bring about dispersion of the pigment. This tough horny type colloid is outside the range of consistencies employed in the kneading operation of the improved process described herein.

The several difficulties inherent to the methods heretofore practiced are eliminated by the present invention which permits the use of cellulose derivative compositions having consistencies definitely outside the range hitherto considered feasible. Thus it makes possible the employment of not only cellulose derivative compositions of definitely higher consistencies than has heretofore been practicable for the ball mill, buhrstone or three-roller ink mill as dispersing media, but also of lower consistencies than are possible to use with the rubber mill rolls.

The invention is of utility in the manufacture of improved pigmented cellulose derivative coating compositions which are widely used in the finishing of numerous articles of commercial trade. The process is of importance in the industry because of the real economic advantages which may be realized through its general adoption for the purpose of successfully dispersing commonly available pigments in cellulose derivative vehicles.

The color of the ultimate enamel manufactured in accordance with the process of the present invention is superior to that secured by prior methods because mechanical distintegration and attrition with attendant contamination from abraded particles of foreign materials are avoided.

The product prepared by the improved process is also characterized by a substantially higher gloss in the final finish indicating that better dispersion has been secured.

The invention provides for a stable intermediate product for the manufacture of enamels which reduces pigment settling and caking tendencies and which, therefore, may be stored for extended periods until convenient to convert to the ultimate composition.

The process is relatively simple. Skilled labor is not required since control of consistency and other operating factors is not as critical as in prior methods.

As many apparently widely different embodiments of this invention may be made without departing from the spirit and scope thereof, it is to be understood that I do not limit myself to the specific embodiments thereof except as defined in the appended claims.

I claim:

1. Process of dispersing dry pigment in a colloided cellulose derivative medium which comprises subjecting a mixture thereof to a mixing and shearing action and adjusting the proportions of ingredients to obtain the maximum resistance to the means producing the mixing and shearing action whereby heat is generated, and cooling the mixture to below 80° C.

2. Process of dispersing pigment in a nitrocellulose vehicle which comprises colloiding 5 to 30 parts of nitrocellulose having a viscosity characteristic between ¼ and 25 seconds in 95 to 70 parts by weight of solvent, adding thereto 300 to 900 parts by weight of dry pigment and in such amount that upon mixing a thick putty-like mass is produced having a consistency such that prolonged heavy pressure with the thumb will just make an impression, subjecting the said mixture to a mixing and shearing action for a time between 5 minutes and 3 hours and at such speed that a large amount of heat is generated, and cooling the said mixture to a temperature below 80° C.

3. Process of preparing an enamel which comprises subjecting the following ingredients to a mixing and shearing action:

| | Parts by weight |
|---|---|
| Nitrocellulose (½ sec.) | 20 |
| Ethyl acetate | 40 |
| Butyl acetate | 15 |
| Ethyl alcohol (denatured) | 10 |
| Toluene | 15 |
| Zinc oxide | 300 | continuing said mixing and shearing action for 5 minutes to 3 hours at such speed that considerable heat is generated, and cooling the mixture below 80° C.

ROBERT TYLER HUCKS.